United States Patent [19]

Bunnell

[11] 4,212,507
[45] Jul. 15, 1980

[54] SELECTIVE INTERCONNECTION SYSTEM AND CONNECTOR

[75] Inventor: Edward D. Bunnell, Palm Harbor, Fla.

[73] Assignee: AMP Incorporated, Harrisburg, Pa.

[21] Appl. No.: 740,999

[22] Filed: Nov. 11, 1976

[51] Int. Cl.² .......................................... H01R 29/00
[52] U.S. Cl. ............................... 339/18 B; 339/126 R
[58] Field of Search ....................... 339/18, 28, 29, 97, 339/98, 99, 258, 113; 174/38; 179/98

[56] References Cited

U.S. PATENT DOCUMENTS

| 1,517,017 | 11/1924 | Roth | 339/113 B |
| 2,647,244 | 7/1953 | Dewey et al. | 339/18 B |
| 3,085,220 | 4/1963 | Sitz | 339/18 B |
| 3,104,925 | 9/1963 | MacNamara | 339/258 R |
| 3,434,093 | 3/1969 | Wedekind | 339/99 R |
| 3,731,254 | 5/1973 | Key | 339/29 R |
| 3,772,571 | 11/1973 | Merry et al. | 339/97 R |
| 3,820,058 | 6/1974 | Friend | 339/99 R |

FOREIGN PATENT DOCUMENTS 1239087  7/1960  France .................................... 339/18 B

OTHER PUBLICATIONS

Electronic Design, Malco Mfg. Co., advertisement, p. 137, 12-1963.

Primary Examiner—Neil Abrams

[57] ABSTRACT

Cross connect system for communications conductors comprises a cable connector which is mated with a cross connection connector. The cable connector has double ended terminals extending therethrough which have wire receiving portions on one end and receptacle portions on their other end. The conductors of the cables are electrically connected to the wire receiving portions of the terminals and the receptacle portions of the terminals are in alignment with cavities which extend through the cross connection connector. A plurality of connector assemblies are mounted in a panel-like member with the cables connected to the terminals in the cable connectors on one side of the panel. Cross connections between the conductors in the cables are made by means of jumper wires which have plug terminals on their ends. The plug terminals are inserted through the cavities in the cross connection connector and mated with the receptacle portions of the terminals in the cable connectors.

4 Claims, 7 Drawing Figures

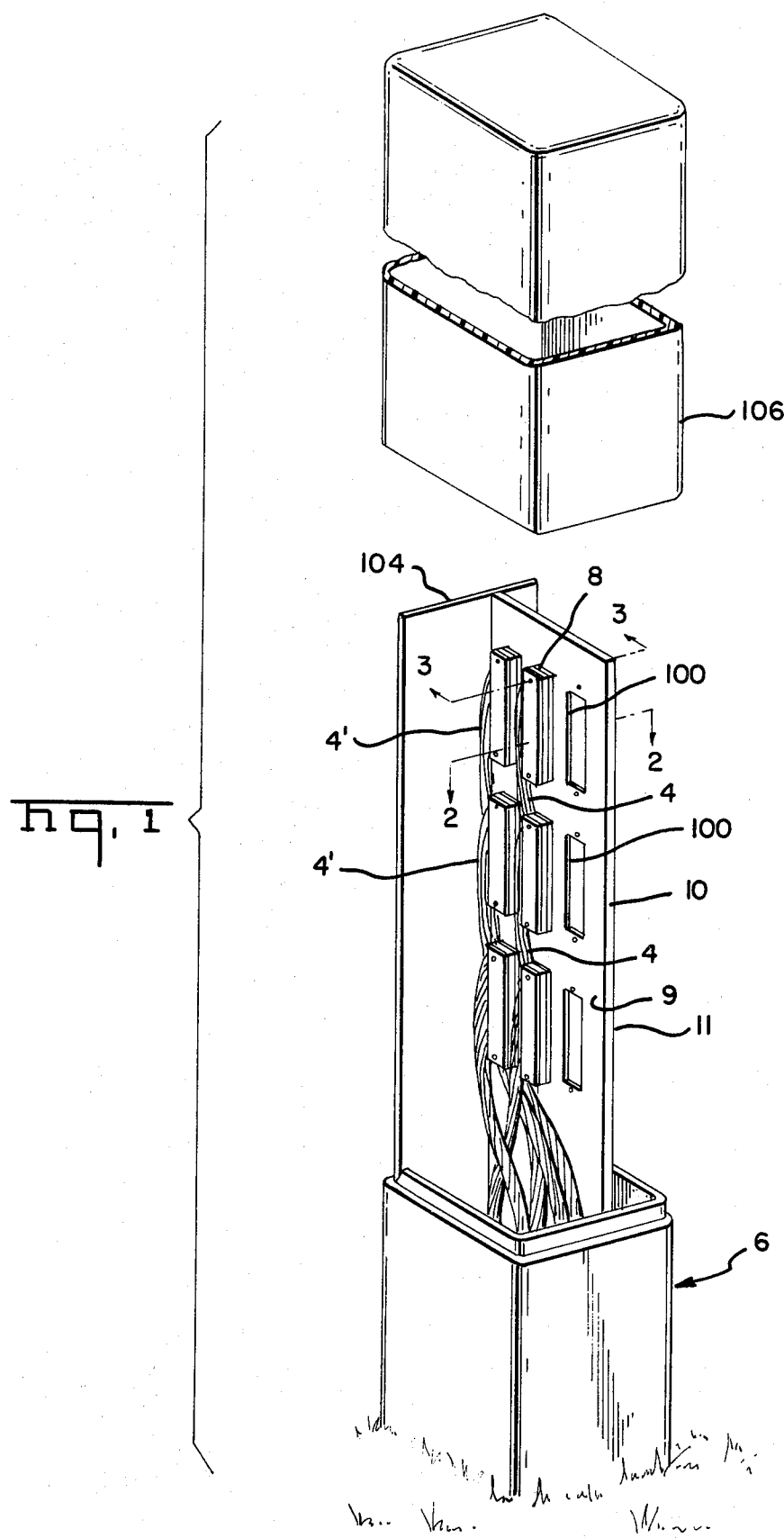

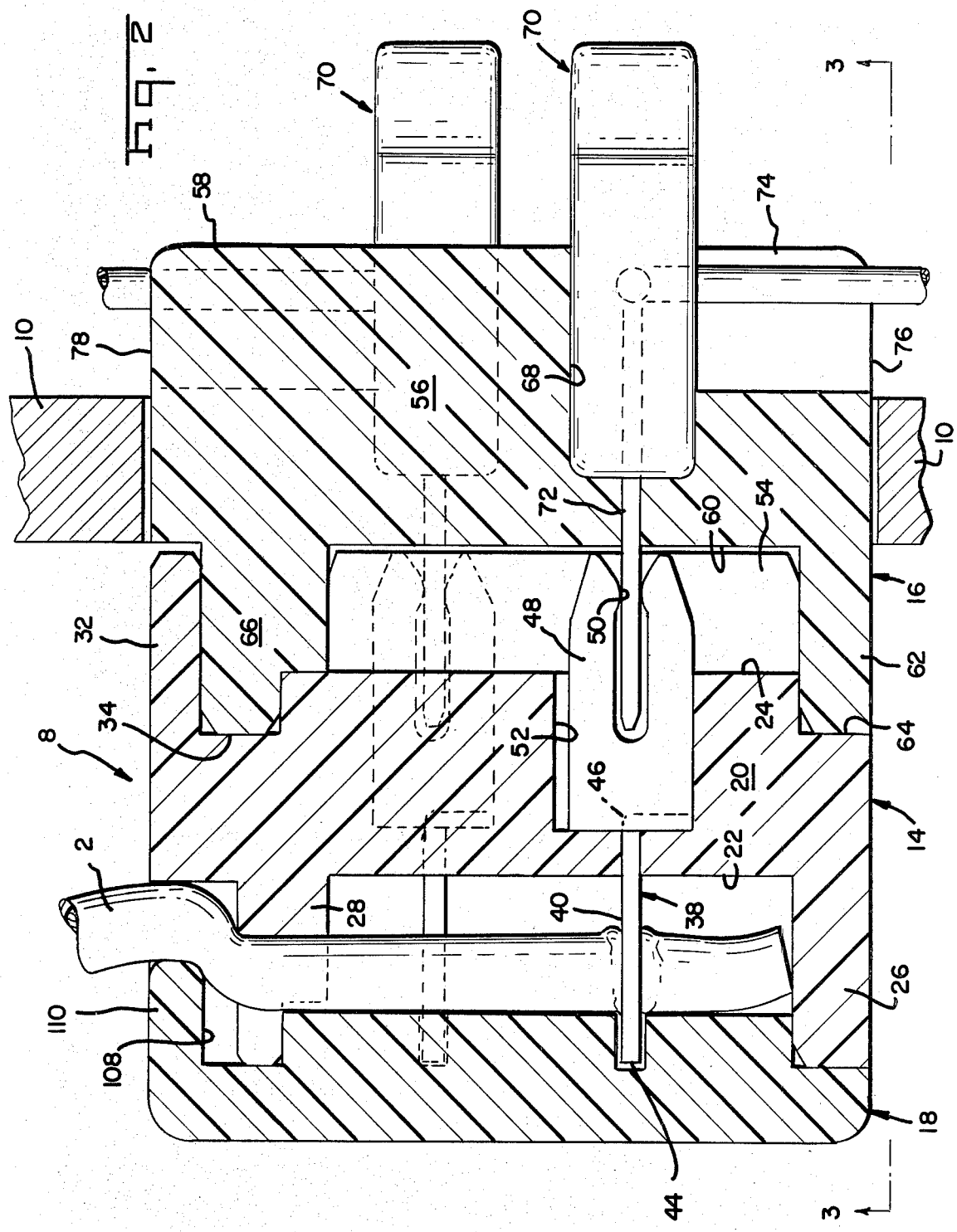

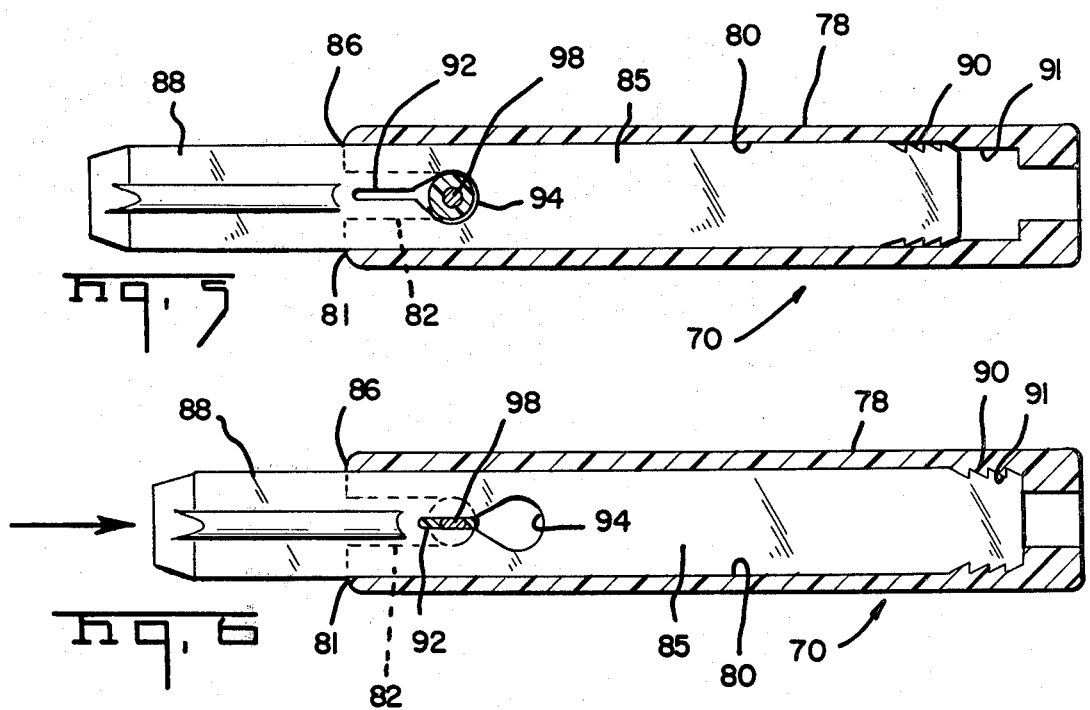
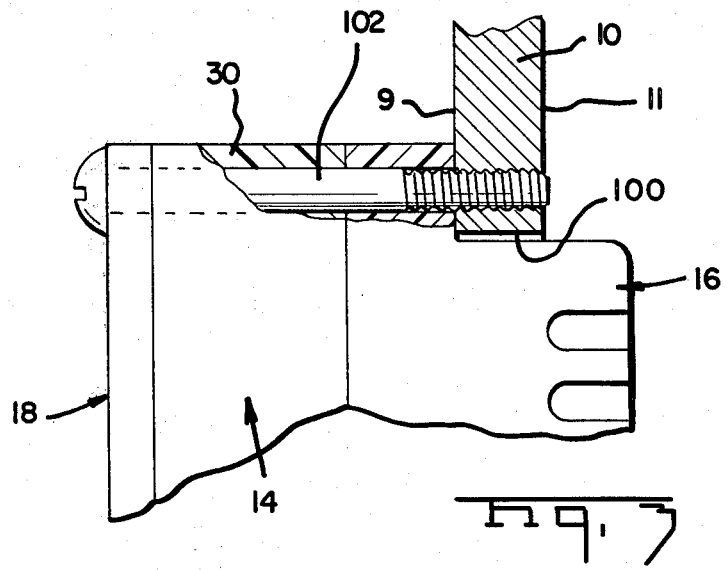

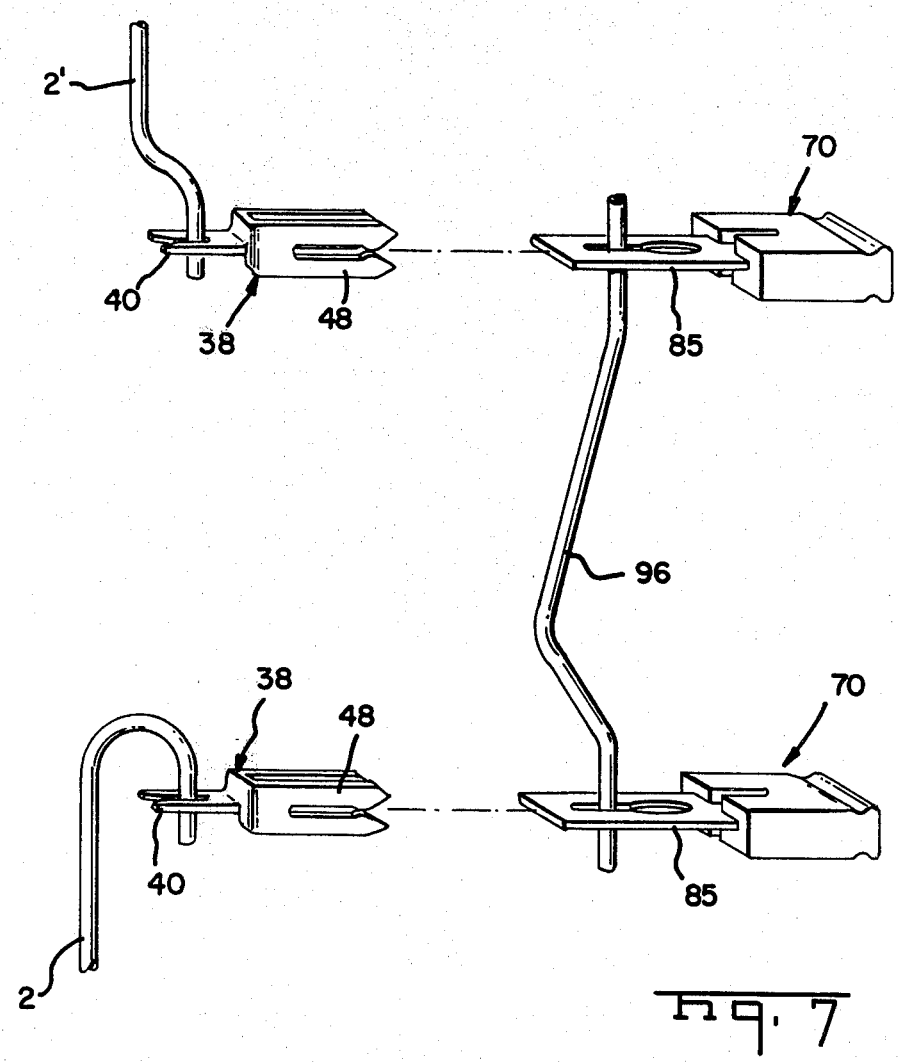

SELECTIVE INTERCONNECTION SYSTEM AND CONNECTOR

BACKGROUND OF THE INVENTION

This invention relates to interconnection systems for selectively connecting the wires in different cables or wire bundles to each other. The invention is herein disclosed in an embodiment comprising a cross connect system for feeder cables and distribution cables in a pedestal type mounting; however, it will be apparent that the principles of the invention can be used under other circumstances where the conductors in a plurality of cables must be selectively interconnected or cross connected.

It is common practice in the telephone industry to provide telephone service within a given area, such as an area containing a group of dwellings, by means of feeder cables and distribution cables which are interconnected or cross connected at a junction location which may be in a pedestal extending above ground. The feeder cables extend from the pedestal to the central office or otherwise into the telephone network and the distribution cables extend from the pedestal to the individual outlets which may be in one building or in several buildings which are located adjacent to each other. When the cross connect junction is installed, the conductors in the feeder cables must be selectively connected to the conductors in the distribution cables and it is desirable to provide a cross connect system which permits changes in the cross connections with relative ease so that the technician can satisfy the changing requirements of the subscribers.

A number of electrical connection systems have been used and are being used to make the cross connections required by the feeder cables and distribution cables. For example, it is common practice to connect the feeder cables to screw type terminals in a junction block, the screw type terminals having integral jumper terminals which may receive jumper wires to make the cross connections. This system requires that each conductor in each feeder cable be electrically connected to the screw type terminal in the junction box. More recently, cross connect systems have been developed around multi-contact electrical connectors which have wire-in-slot terminals for making the electrical connections to both the feeder cables and other jumper wires. One such system employs electrical connector modules of the type shown in U.S. Pat. No. 3,708,779. An advantage of a system of this type is that a standard, or slightly modified, multi-contact electrical connector of the type used for making conventional cable splices can also be used for making the cross connections.

There are several comparative shortcomings of the existing systems for making cross connections; for example, many of the present systems are less than entirely satisfactory because of random and uncontrolled routing of the wires in the junction area and the completed cross connecting system may comprise jumper wires extending in an undesirably disorganized mass between connectors. As mentioned above, changes must be made in cross connect systems on occasion and it is desirable to provide a system which permits these changes to be made rapidly and accurately by the technician.

The present invention is specifically directed to the achievement of an improved cross connect system in which changes in the wiring pattern can be made by simply removing terminals on the ends of jumper wires from a connector and reinserting the same terminals into different openings in the same connectors to effect the change. The invention is also directed to the achievement of a cross connect system which can be wired by the technician in an extremely short time and which will, during wiring, result in an orderly and neat routing arrangement for the wires extending to the system. The invention is directed to the achievement of other features and conveniences as will be described below.

It is accordingly an object of the invention to provide an improved interconnection system for a plurality of wire bundles or cables. A further object is to provide an improved cross-connect system for use in communications cables. A further object is to provide an improved pedestal type cross connect arrangement for telephone conductors. A further object is to provide a cross-connect system which is convenient to install and service, particularly with regard to connecting the wires of the cables to the system, making the required cross connections between the wires in the cables, and changing the cross connections when required.

These and other objects of the invention are achieved in preferred embodiments thereof which are briefly described in the foregoing abstract, which are described in detail below, and which are shown in the accompanying drawing in which:

FIG. 1 is a perspective view of a pedestal, having the covering exploded therefrom, in which a cross connect system in accordance with the invention is installed.

FIGS. 2 and 3 are views taken along the lines 2—2 and 3—3 of FIG. 1 showing the cross connector assemblies and the manner in which they are mounted in the pedestal.

FIGS. 5 and 6 are sectional side views of a connector device for jumper wires, FIG. 5 showing the positions of the parts of the device prior to its being installed in the end of a jumper wire and FIG. 6 showing the parts after they have been installed on the end of a wire.

FIG. 7 is a perspective view of a jumper wire having terminal devices on its ends and showing the types of terminals used for the feeder and distribution conductors in the connector assembly.

Figure 4:
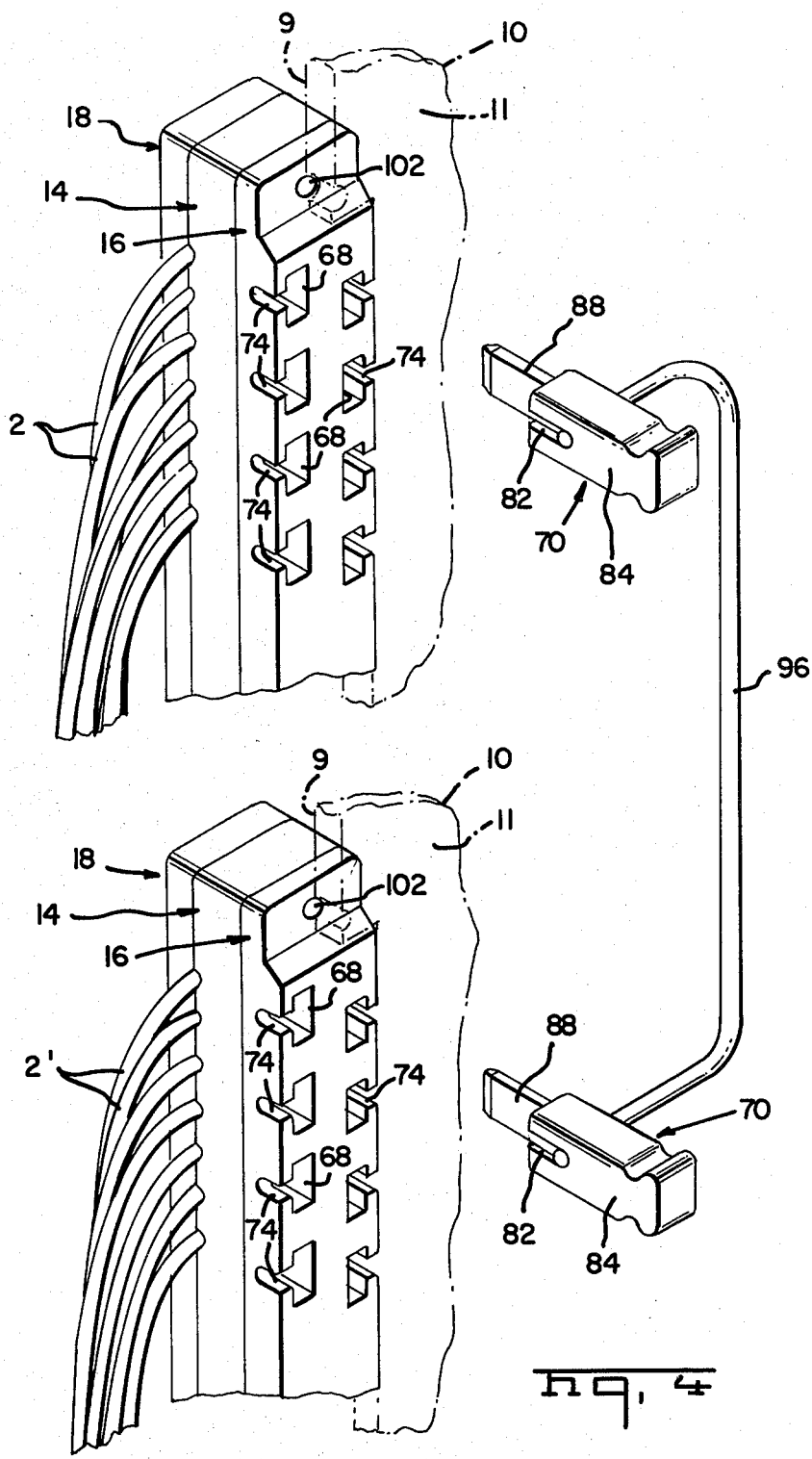
FIG. 4 is a fragmentary perspective view showing a portion of the cross connection side of a support panel in the pedestal and illustrating the manner of making the cross connections between different cables.

As shown in FIG. 1, a pedestal type cross connect system in accordance with the invention comprises a pedestal 6 in which feeder cables 4 and distribution cables 4' are contained. It will be understood that the feeder cables extend from a central office or other source and the distribution cables 4' extend to outlets such as separate dwellings. The cables 4, 4' are made up of individual wires or conductors 2, 2' which are cross connected in the pedestal to provide service from the central office to the individual subscribers.

The cross connections are made by means of connector assemblies 8 which are mounted in openings 100 in a mounting panel 10 of the pedestal. Each connector is associated with one cable or wire bundle 4 or 4' and the individual wires of the bundle are connected terminals in the connector as described below in any suitable manner, for example, by means of a suitable hand tool or by an insertion apparatus.

Each connector assembly 8 comprises a cable connector 14, a cross connection connector 16, and a cover member 18. As will be explained below, the individual wires 2, 2' are connected to terminals in the cable connectors 14 and the cross connections are made by jumper wires having terminals thereon which are inserted into cavities in the cross connection connector 16.

The cable connector 14 comprises generally rectangular housing 20 of suitable insulating material having a cable receiving face 22 and a mating face 24, these faces being directed as shown in FIG. 2. Sidewalls 26, 28 extend outwardly from the cable receiving face 22 and end walls 30 extend transversely across the ends of the housing as shown in FIG. 3. A flange 32 extends rightwardly as viewed in FIG. 2 from the upper end of the mating face 24 and a trough or recess 34 extends alongside this flange for reception of a portion of the cross connection connector.

A plurality of double ended contact terminals 38 are mounted in the housing 20 and extend between the cable receiving face 22 and the mating face 24. The cable receiving end of each terminal comprises a plate-like section 40 having a wire receiving slot 42 which extends inwardly from its free end 44. The width of the slot in each terminal is such that when a wire is forced laterally of its axis and into the slot, the edges of the slot penetrate the insulation of the wire and establish electrical contact with the conducting core thereof.

The fixed end of each plate-like section 40 is reversely folded as shown at 46, this reverse fold being integral with a web portion from which sidewalls 48 extend rightwardly, as viewed in FIG. 2, to the mating face 24. The sidewalls lie in parallel planes which extend normally of the plane defined between plate-like portion 40 of the terminal and the sidewalls are bifurcated to define two spaced-apart arms. The ends of these arms have inwardly directed contact portions 50 which engage an inserted blade terminal as will be described below. As also shown in FIG. 2, the sidewalls are received in recesses 52 which extend inwardly from the mating face 24 and barriers 54 extend beyond the mating face and between adjacent terminals to provide the required dielectric characteristics. The terminals 38 are arranged in spaced-apart rows with the terminals of each row being offset relatively to the terminals of the other row.

The cable connector 14 and the terminals 38 in this connector can be made in accordance with the teachings of the co-pending application of James Fleischhacker et al, Ser. No. 783,127, filed Mar. 31, 1977, now Pat. No. 4,127,312, and the wires 2, 2' of the bundles or cables 4, 4' can be trimmed and inserted into the slots in the terminals 38 by means of a hand tool or suitable insertion tool which inserts all of the wires substantially simultaneously.

The cross connection connector 16 comprises a generally prismatic housing body 56 having a rightwardly facing (as viewed in FIG. 2) cross connecting face 58 and a leftwardly facing mating face 60 which is opposed to the mating face 24. Walls 62, 66 extend from the housing body on each side of the face 30, the wall 62 being received in a recess 64 in the connector 14 and the wall 66 having a reduced end which is received in the previously identified trough 34. The flange 32 overlaps the outwardly facing surface of the wall 66 as shown and similar overlapping wall portions are provided in the end walls to prevent or retard the entrance of moisture to the interior of the connector assembly.

A plurality of cavities 68 extend through the connector body 56 from the cross connecting face 58 to the mating face 60 for the reception of terminal devices 70 on the ends of jumper wires 96. These cavities are enlarged adjacent to the face 58 therefore and have reduced portions 72 which extend to the mating face 60, the reduced portions being dimensioned to receive the blade portion 86 of a terminal device 70 on a jumper wire. It will also be noted that a laterally extending cavity or recess 74 extends from each cavity 68 to the adjacent side 76 or 78 of the housing and the jumper wires are normally disposed in these recesses.

Referring now to FIGS. 5, 6, and 7, each terminal device 70 comprises a housing 78 having a relatively deep narrow recess 80 extending inwardly from one end 81 thereof. Notches 82 extend inwardly from opposite sides 84 of the housing and communicate with the recess 80. The contact terminal 85 is disposed in the recess and has a projecting blade portion 88 which is dimensioned to be received by the contact portions 50 of a receptacle portion of one of the terminals 38. Each terminal is serrated as shown at 90 on its right hand end as viewed in FIG. 5 which retain it in the housing after it has been installed on a wire as described below. It will be noted that the inner end of the recess 80 is of reduced width as shown at 91 to provide an interference fit for the serrated end of the contact terminal 85.

An enclosed wire receiving slot 92 is provided in the terminal device 85 and communicates with a circular opening 94, the diameter of which is slightly greater than the diameter of the jumper wire as shown in FIG. 5. The terminal device is ordinarily supplied to the technician with the parts in the positions shown in FIG. 5, that is, with the circular opening 94 in alignment with the notches 82. When the terminal device is to be installed on the end of a jumper wire 96, the wire is inserted through one of the notches 82 and through the circular opening 94. Thereafter, the technician simply pushes the terminal blade 85 rightwardly until it is in the position of FIG. 6 with the teeth 90 in engagement with the internal wall portions of the housing 91. During inward movement of the blade 85, the wire moves relatively into the slot 92, the insulation of the wire is displaced, and electrical contact is established with the core 98 of the wire 96.

The connector assemblies 8 are secured to the panel 10 by means of bolts 102 which extend through aligned openings in the cover member 18 and through the connector sections 14 and 16. The ends of the bolts are threaded into openings in the panel. It will be apparent that after the conductors in the individual cables or bundles 4, 4' have been connected to the terminals in the cable connectors 14 and the connector assemblies 8 have been assembled to the panel 10, the technician can make the necessary cross connections between the distribution and feeder cables 4, 4' by simply inserting terminal devices 70 on the ends of jumper wires 96 into the appropriate cavities 68 in the cross connection connectors 16. The cross connection connectors are accessible only from the right hand side 11 of the panel and the cross connections can therefore, be made without disturbing the cable connections which are accessible only from the lefthand side 9 of the panel.

The cover member 18 comprises a rectangular block which has recesses in its internal surface for the combination of the free ends 44 of the terminals 38. As shown in FIG. 2, the cover member has a flange 110 which is suitably notched for the accommodation of the conductors 2 or 2' and which provides a strain relief for the conductors.

The pedestal 6 has one wall 104 which extends upwardly beyond the remaining three walls and the panel 10 is secured to and extends from this wall. A suitable cover 106 is provided which is assembled to the pedestal after all of the cross connections and cable connections have been made.

A salient advantage of the invention is that the feeder cables 4 and distribution cables 4' can be terminated on the separate cable connectors 14 by the technician in a relatively short time interval. As mentioned previously, the conductors 2, 2' of these cables can be connected to the terminals 38 by a suitable hand tool or preferably by an insertion apparatus of the type disclosed in my copending application Ser. No. 740,996 filed Nov. 11, 1976, now U.S. Pat. No. 4,044,451. This apparatus can be mounted in the openings 100 of the panel 10 while the connections are being made and its use completely avoids the necessity of handling the conductors 2, 2' individually. Moreover, and as will be apparent from FIG. 1, the individual cables 4, 4' will be neatly dressed on the side 9 of the panel 10 after these connections to the cables connectors have been made and will be separated from the cross connections which are on the side 11 of the panel. The cross connections can also be made very rapidly by merely inserting the terminal devices 70 into the recesses 68. The technician can produce jumper wires of the desired lengths while he is making the cross connections by virtue of the fact that the terminal devices 70 can be applied to the jumper wires in the field or at the work site. The routing of the jumpers 96 is, as noted above, separated from the cable connectors by the panel 10 and the cross connections can be serviced or otherwise changed by the technician without disturbance to the cable connectors. Under some circumstances, it might prove desirable to provide separate doors on the cover member 106, one door or opening providing access to the side 9 of the panel 10 and the other door providing access only to the side 11. The connections of the cables or bundles to the cable connectors are usually permanent and should not be disturbed after they have been made. The separation of the cable and cross connections by the panel 10 insures that there will be no disturbance to these cable connectors.

What is claimed is:

1. A cross connect system for a plurality of bundles of discrete communications conductors, said system comprising:
   a panel having oppositely directed first and second sides, and an electrical connector assembly for each of said bundles removably mounted in said panel,
   each of said assemblies comprising a cable connector housing and a cross connection connector housing, each of said cable connector housings having a conductor receiving face and a mating face, said faces being oppositely directed,
   each of said cross connection connector housings having a mating face and a cross connecting face, said faces in said cross connection connector housing being oppositely directed and having a plurality of openings extending therebetween,
   said housings being mated with each other with said mating faces opposed to each other, said conductor receiving face of said cable connector housings being accessible from said first side of said panel and said cross connecting face of said cross connection connector housing being accessible from said second side of said panel,
   a plurality of double ended electrical contact terminals mounted in, and extending between said faces of, said cable connector housing, each of said double ended terminals having a wire-receiving portion at said conductor receiving face and a receptacle portion at said mating face, said conductors of each of said bundles extending to said conductor receiving face of one of said cable connector housings and being connected to said wire-receiving portions of said double ended terminals of said one of said cable connector housings,
   a plurality of jumper wires having jumper wire terminals on their ends, each jumper wire extending between two of said cross connection connector housings on said second side of said panel member and having its jumper wire terminals inserted through said openings in said cross connecting faces of said two cross connection connector housings and into said receptacle portions of selected double ended terminals in the mating cable connector housings whereby,
   said bundles are disposed adjacent to said first side and said jumper wires are adjacent to said second side, and said conductors of said bundles are changeably interconnected by said jumper wires on said second side.

2. A cross connect system as set forth in claim 1, said panel having a plurality of openings therein, each of said connector assemblies being removably mounted in one of said openings.

3. A cross connect system as set forth in claim 2, each of said cross connection connector housings having laterally extending recesses on said cross connecting face, each of said recesses communicating with one of said openings, and extending to, one side of said cross connection connector housing, said jumper wires extending laterally and through said recesses.

4. A cross connect system for an underground telephone cable means comprising:
   a pedestal having a removable cover, a vertically extending mounting panel in said pedestal, said mounting panel having oppositely directed first and second surfaces,
   a plurality of wire bundles extending upwardly in said pedestal along side said first face and a plurality of electrical connector assemblies mounted in said panel, each of said bundles extending to one of said connector assemblies,
   each of said assemblies comprising cable connector housing and a cross connection connector housing each of said cable connector housings having a conductor receiving face and a mating face, said faces being oppositely directed,
   each of said cross connection connector housings having a mating face and a cross connecting face, said faces in said cross connection connector housing being oppositely directed and having a plurality of openings extending therebetween,
   said housings being mated with each other with said mating faces opposed to each other, said conductor receiving face of said cable connector housings being accessible from said first side of said panel and said cross connecting face of said cross connection connector housing being accessible from said second side of said panel,
   a plurality of double ended electrical contact terminals mounted in, and extending between said faces of, said cable connector housing, each of said double ended terminals having a wire-receiving portion at said conductor receiving face and a receptacle portion at said mating face, said conductors of each of said bundles extending to said conductor receiving face of one of said cable connector housings and being connected to said wire-receiving portions of said double ended terminals of said one of said cable connector housings, a plurality of jumper wires having jumper wire terminals on their ends, each jumper wire extending between two of said cross connection connector housings on said second side of said panel member and having its jumper wire terminals inserted through said openings in said cross connecting faces of said two cross connection connector housings and into said receptacle portions of selected double ended terminals in the mating cable connector housings whereby, said bundles are disposed in said pedestal adjacent to said first side and said jumper wires are adjacent to said second side, and said conductors of said bundles are changeably interconnected by said jumper wires on said second side.

* * * * *